May 8, 1934.      J. BIJUR      1,957,440
CONDUIT INSTALLATION AND ELEMENTS
Filed Sept. 30, 1929      2 Sheets-Sheet 1
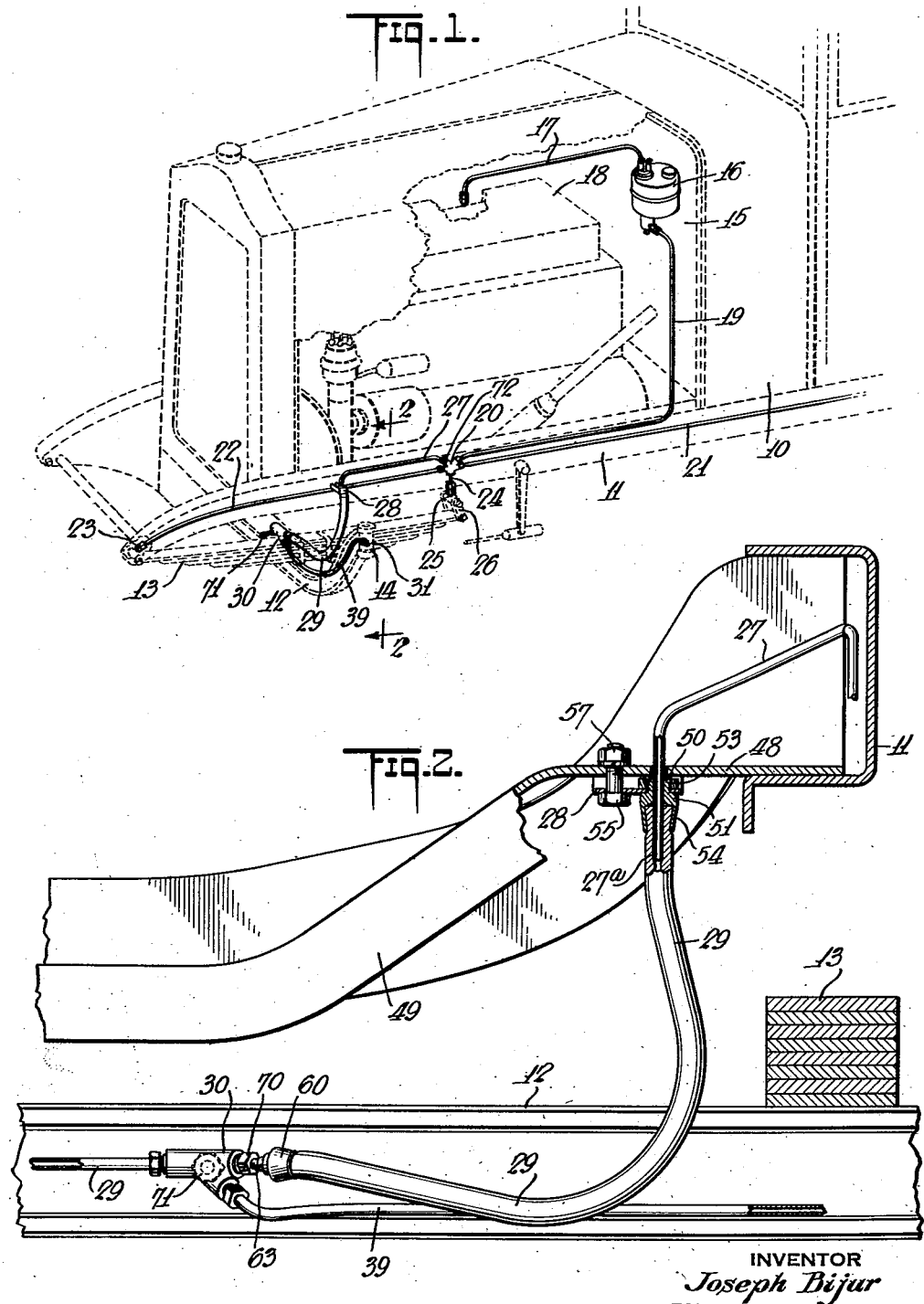
INVENTOR
Joseph Bijur
BY
Dean, Fairbanks, Obrieght & Hirsch
his ATTORNEYS.

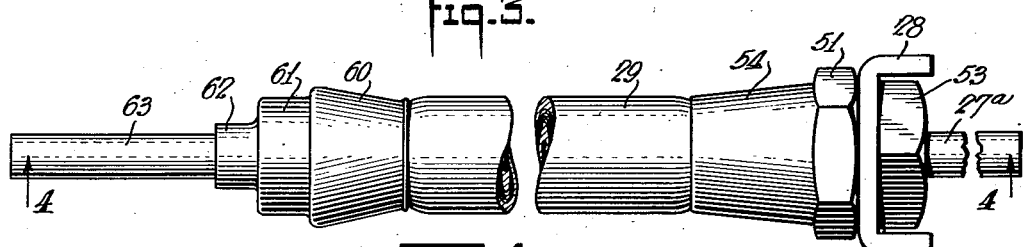
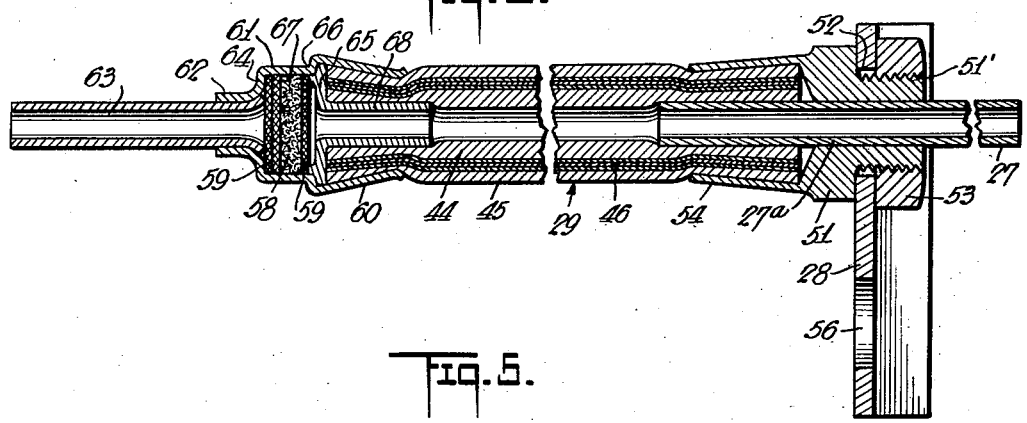
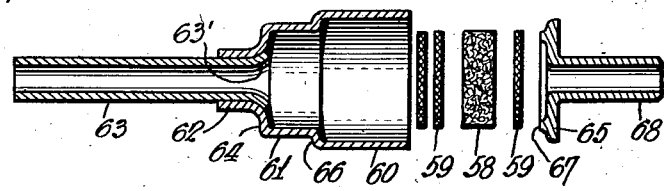
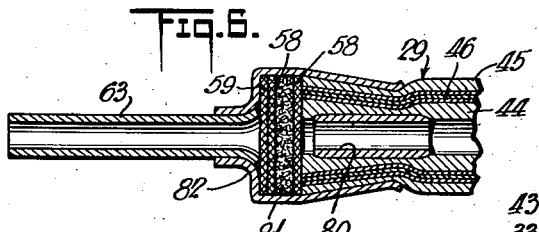
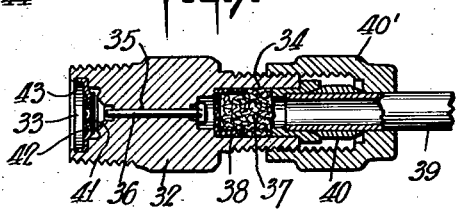

Patented May 8, 1934

1,957,440

UNITED STATES PATENT OFFICE 1,957,440

CONDUIT INSTALLATION AND ELEMENTS

Joseph Bijur, New York, N. Y., assignor to Auto Research Corporation, a corporation of Delaware Application September 30, 1929, Serial No. 396,304

28 Claims. (Cl. 184—7)

My present invention relates to conduits and conduit systems and while it has specialized utility in centralized lubricating systems, more particularly for motor vehicles, it is applicable in other relations.

In transmitting liquid or liquid pressure from one to the other of two relatively movable structure parts and particularly in conveying lubricant from the frame to bearings on the unsprung parts of a motor vehicle it is frequently desirable to employ as the bridging conduit, hose made of rubber and canvas or equivalent material, which when properly installed so as not to receive excessive torsional strain, will stand up for a considerable time under the pressure and vibration to which it is subjected.

One of the difficulties encountered with hose of this type is the tendency to disintegrate at its bore, under the action of the oil, and this is particularly true in the case of oil-filled systems such as those of my prior Patent No. 1,632,771 of June 14, 1927 in which oil is at all times in contact with the interior of the hose. While the usefulness of the hose as a non-leaking oil conduit may not be impaired for long periods by this disintegration, the particles thus separated, when entrained with the oil might interfere with the operation of the flow controlling elements therebeyond. This difficulty is particularly serious in a system of the character disclosed in my said prior patent, the debris of oil-soaked rubber in time clogging the entrance to some or all of the drip plugs supplied from such hose in the patented system, even where each of such drip plugs is equipped with its strainer. Such clogging of the drip plugs or of some of them would involve serious annoyance in locating those that are deranged and expense for service and replacement parts.

It is a general object of the invention to prevent clogging or other disturbance in a lubricating system of the type involving outlets that are subject to such difficulty, while using as the bridging element between relatively movable structure parts, flexible hose that is apt to give off soft disintegration product into the course of oil flow.

Another object is to accomplish the desired result without adding materially to the cost or bulk of the equipment or adding at all to the number of separate elements that must be handled in connecting up the installation and in which economy in the number of junctions may be effected.

In a preferred embodiment the hose is made up as a complete unit embodying in its construction, the means for excluding the debris thereof from the cloggable elements therebeyond, said means at the same time in no way interfering with the free flow of clean lubricant therethrough. Specifically, the outlet end of the hose is preferably provided with a ferrule embodying in its construction a disk of wool felt preferably backed by wire mesh screen of cross-sectional area preferably larger than that of the conduit system.

Another object is to provide a hose unit adapted for ease of installation and without likelihood of strain or rupture of the parts, even though carelessly handled.

For this purpose the hose is provided at one, or preferably at both ends, with pre-assembled metal tubing extensions adapted for convenient attachment to the junctions, T or outlet fittings commonly employed on the vehicle for mounting the chassis piping lines. Preferably one of the metal tube extensions is of considerable length to adapt the unit for connection with junctions relatively remote from the end of the hose. It is preferred to provide a distinct mounting bracket for mechanically supporting the hose end with respect to the supporting structure.

The invention may be more fully understood from the following description in connection with the accompanying drawings, wherein Fig. 1 is a fragmentary perspective view showing in dotted lines the front end of an automobile and showing in full lines portions of the centralized lubricating system germane to the present invention.

Fig. 2 is a view considerably enlarged in transverse section looking forward from behind the front axle and taken approximately on the line 2—2 of Fig. 1.

Fig. 3 is a broken plan view of a bridging conduit and its associated anchorages.

Fig. 4 is a longitudinal sectional view on the line 4—4 of Fig. 3.

Fig. 5 is a disassembled sectional view of the hose coupling which carries the strainer, showing the relation of the various parts.

Fig. 6 is a longitudinal sectional detail through a modified form of the strainer carrying coupling, and Fig. 7 is a sectional detail of one type of flow controlling outlet or drip plug.

Referring first to Fig. 1 of the drawings, the reference numeral 10 designates the body of an automotive vehicle supported upon the usual chassis frame bars 11 which in turn are mounted upon the front axle 12 and the rear axle (not shown) by leaf springs 13. At each end of the front axle there are provided the usual steering knuckles 14 and associated mechanism for turning the front wheels. The present invention is not concerned with the structural details of these knuckles and all showing of the usual knuckle clevises and associated wheel mechanism is accordingly omitted.

The lubricating system in which my invention is illustratively shown may include a reservoir 16 mounted on the dashboard, provided with a pump the details of which are not shown and which is operated for instance from the intake manifold of the engine through a suction pipe 17.

Various arrangements of piping might be used for conveying lubricant to the bearings on the main frame 11. Illustratively a conduit 19 is shown leading from the pump to a distributing junction fitting 20 on one of the chassis frame bars 11. From the junction, outlet main pipe 21 leads rearwardly and has a plurality of taps with drip plugs (not shown) to carry lubricant to the corresponding bearings. Outlet pipe 22 leads forwardly to lubricate the pivotal connection between the front end of the spring 13 and the frame 11, a drip plug 23 at the bearing determining the flow thereto. A short connection 24 from the junction fitting leads to the spring shackle 26.

One of the outlet sockets of the junction supplies the hose device that leads to the axle. For this purpose said hose is preferably a preassembled unit, the details of which will be described below, comprising a hose section proper 29 and a metal pipe extension 27. The latter is affixed to the junction preferably by a compression coupling including a threaded bushing 72 and the outlet end of the hose is connected by means of a similar coupling involving a threaded bushing 70 to the inlet of a Y fitting 30 affixed by bolt 71 to the rear surface of the axle. Pipes 29, 39 connected to the outlet arms of the fitting 30 are equipped with drip plug outlets 31 at the knuckles from which the bearings of the latter receive lubricant. The inlet end of the hose section of the unit is preferably affixed to the frame by means of a bracket construction 28 also to be described below.

The invention is of utility in substantially any distributing system, the outlets of which are subject to clogging or other derangement by rubber debris.

In Fig. 7 is shown a preferred drip plug construction which taken by itself is not claimed herein, but with the use of which or as an element in combination therewith, my invention has particular utility. Each drip plug has a body portion 32 to be threaded into the stationary element of the bearing and a threaded inlet end to which the feed pipe 39 may be connected by compression coupling 40 and nut 40'. The drip plug has sockets 33, 34 in its opposite ends connected by bore 35 substantially filled by flow restriction pin 36.

A flap valve 41 working against an outwardly facing seat 42 in the base of the fitting and retained against loss by a perforated disk 43 serves to prevent siphoning through the conduit lines, where the drip plugs are located at materially different levels.

In advance of the restricted flow passage defined by the bore 35 and pin 36, a strainer wad 37 is disposed which is sustained by a wire mesh cup 38 fitting into the socket 34. This strainer serves to intercept any dirt, scale, oxide or other solids in the piping that might be entrained with the oil and that might otherwise clog the restriction passage of the drip plug, or become lodged at the valve seats of one or more drip plugs.

In Figs. 3 to 5 of the drawings are illustrated the details of the hose unit. A desirable inexpensive hose structure 29 has inner and outer laminations 44 and 45 of rubber with a plurality of layers of woven fabric 46 interposed between them. The inner layer of rubber is substantially impervious to oil and the presence of the fabric aids materially to reinforce the hose, and to prevent distension thereof under internal pressure.

The inlet terminal of the hose 29 is preferably formed as a preassembled unit therewith for facility in connection. Preferably this construction comprises a ferrule 51 having a skirt 54 that encircles the end of the hose. Metal pipe 27 is preassembled as an element of the hose unit and its extremity affixed by passing through an axial bore in the ferrule at 27a and shellacking its inner end in place within the hose end. The ferrule skirt 54 is now swaged inward as shown to clamp the hose against the inner end of the tube. The material of the hose end is sharply compressed due to the combined spreading action of inserted pipe end 27a and the constriction of skirt 54.

Nut 53 is laid into a channel-shaped mounting bracket 28 and threaded stud 51' on the ferrule is passed through opening 52 of said bracket and screwed into the nut to clamp the bracket thereagainst. While the nut 53 is retained by the flanges of the bracket, it may also if desired, be staked in place. The bracket 28 may be bolted to the channel frame as at 48 by a headed bolt 55 passing through an opening 56 in the bracket and secured by nut 57.

The terminal fitting at the outlet end of the hose carries a filter consisting of a felt mat 58 confined between wire mesh disks 59. Preferably two of these disks are superposed at the outlet side of the filter as shown. This fitting is likewise formed with a ferrule having a skirt portion 60 adapted to be slipped freely over the end of the hose. A socket 61 beyond the skirt and of slightly less diameter confines the filter mat and its wire mesh disks. The ferrule has an integral reduced outlet sleeve 62 into which a metal tube extension conduit 63 is sweated, the end being flared outwardly at 63' against the flared base of sleeve 62.

The outer filter backing screen 59 lies against the annular shoulder 64 defined between the cylinder elements 62 and 61 and may engage the flared extremity 63' of pipe 63. The filter is held in position by a disk 65 which lies against the shoulder 66 defined by the cylinder element 61 and the skirt element 60 of the ferrule and is provided with an annular rib 67 fitting within the filter socket 61 and abutting the outer screen 59 of the filter device. Disk 65 is formed with an integral tubular axial extension 68 against which the material of the hose is compressed as the cylinder 60 is swaged inwardly to tightly compress the latter.

Fig. 5 shows pipe end 63 sweated to the ferrule 60 and the elements otherwise disassembled. For assembly the inner strainer screens 59, pad 58 and the other screen 59 are dropped into receiving socket 61. Tube 68 which has first been inserted into the end of the hose is admitted at its enlarged disk end 65 into skirt 60 until its rim abuts shoulder 66. The cylinder 60 is then swaged to complete the terminal.

The hose filter 58 is preferably of considerably heavier and denser felt than that of the strainers 37 in the drip plugs. Illustratively it may be of heavy felt capable of intercepting even slimy mixtures or decomposition products of rubber and oil.

The diameter of the felt 58 is seen to be as great as the outer diameter of the hose and its effective area is thus several times that of the drip plug strainers.

Preferably the metal tubing extension 63 of the hose unit is relatively short and serves merely for convenient terminal connection, the ferrule 60 at the outlet of the hose coming close to the mounting bushing 70. The metal tubing extension 27 at the other, or inlet end, on the other hand is preferably considerably longer as shown, so that the free extremity of the latter may be connected to junction 20 or other mount relatively remote from the structure to which the hose is to bridge. Bracket 28 constitutes a convenient mechanical mount to affix the inlet end of the hose proper as close as convenient to the structure to which the hose is to bridge, so that the latter may be of minimum length.

In Fig. 6 is illustrated a modification in which the integral disk and tubing element 65, 68 are dispensed with and a separate short length of tube 80 inserted into the hose end serves to take the clamping pressure of the swaged ferrule skirt. The coupling cylinder 81 is shown in this embodiment of uniform diameter from its mouth to the shoulder 82 against which the inner screen 59 of the filter abuts and the end of the hose abuts the outer screen 59.

In use, oil will be propelled through the pipe system and through the hose in the manner well understood. After a considerable period of use the hose may begin to disintegrate at its bore under the action of the oil therein. The oil soaked debris thus released is carried with the oil but will be intercepted at the filter 58 in the outlet ferrule, while clean oil continues in its flow through said filter to the drip plugs. In time the debris from the hose will clog the filter 58 to such extent that little or no oil can flow therebeyond and this readily becomes apparent by the dryness of the bearings of the axle or other part fed from the hose. When this occurs or is imminent, the hose unit is readily removed by disconnecting bushings 70 and 72 and unscrewing bolt 55, 57. A new hose unit is now readily installed by attaching the mounting bolt 55, 57, connecting the inlet end of pipe extension 27 by means of bushing 72, and re-connecting the outlet end by means of bushing 70. Regardless of the amount of debris released from the hose, the filter thereof however protects the drip plugs which cannot become deranged due to clogging even under adverse operating conditions.

While there has been described a fairly complete lubricating system, the invention is more particularly concerned with the hose unit of Figs. 3 to 6 both as an article of manufacture and in combination in systems generally in which it would have utility. The specific mode of installing the hose, shown in Figs. 1 to 2 while desirable represents merely one of various possible applications. The invention is useful in systems involving flow controlling means therebeyond other than the specific drip plug disclosed and from its broadest aspects may be useful with constructions generally, that are subject to derangement due to debris from the hose.

It is also understood, that while the hose is preferably constructed as a composite unit with a length of bendable metal tubing and a length of hose in series, the invention from one aspect may be embodied in the hose length without the metal extension, or for some applications with a metal extension at each end, and a fastening bracket at one or both ends of the hose.

It will also be understood that while the system has a preferred application where the pipe lines are at all times intended to remain filled with oil it is not limited to such use but may be applied to normally empty lines whether of the pressure feed or gravity feed type.

Thus, I have provided a simple, compact, relatively neat and rugged flexible bridging conduit, which while ultimately subject to destruction, involves in its construction or has closely associated therewith, the means for effectively protecting the drip plugs or other sensitive flow controlling outlet fittings from becoming deranged through the accumulation thereat of debris from the hose.

I claim:—

1. A centralized liquid distributing installation including a source of liquid, a branched distributing system having flow controlling devices subject to clogging, a flexible hose connected between the source of lubricant and the distributing system and subject to disintegration at its bore by the contact of the liquid therewith, and means in the course of flow between said hose and the distributing system therebeyond to protect the flow controlling devices from clogging with debris of the hose.

2. The combination with a structure element having a source of liquid thereon and a relatively movable structure element having a restricted liquid outlet thereon, of a flexible conduit of type subject to slow disintegration by the action of the liquid and interposed in the line of liquid flow from the source to the outlet and adapted to bridge from one to the other structure element, said flexible conduit including filter means assembled with the outlet end thereof to intercept debris of decomposition of the flexible conduit.

3. In a central lubricating installation, the combination of a source of lubricant, a branched distributing system movable relative thereto, a flexible hose connecting the source to the branched system, and subject to disintegration at its bore by prolonged contact of oil therewith, restricted outlets on the branched distributing system, each said outlet including means for intercepting solid particles entrained with the oil, and means to protect said protected outlets from derangement due to debris from the hose, said means including a filter in the course of flow from the hose to the branches of the distributing system.

4. In a central lubricating installation, the combination of a branched distributing system having drip plug outlet fittings, each of said fittings including a strainer at its inlet capable of intercepting chips and scale from the connecting piping, a source of lubricant for said distributing system, movable relative thereto, a flexible hose connecting said source to said distributing system, said hose subject in time to disintegration at its bore due to action of oil and to degree sufficient to clog the drip plugs, and a filter near the outlet end of the hose and of density greater than that at each of said drip plugs, for intercepting the debris from the hose and thereby protecting said drip plugs.

5. In a central lubricating installation, the combination of a branched distributing system having drip plug outlet fittings, each of said fittings including a strainer at its inlet capable of intercepting chips and scale from the connecting piping, a source of lubricant for said distributing system, movable relative thereto, a flexible hose connecting said source to said distributing system, said hose subject in time to disintegration at its bore due to action of oil and to degree sufficient to clog the drip plugs, and a filter near the outlet end of the hose and of area several times greater than the area of said drip plug strainers for intercepting the debris from the hose and thereby protecting said drip plugs.

6. A centralized chassis lubricating system including a source of lubricant and a distributing conduit system supplied therefrom, said elements being mounted on the main frame of the chassis, a member movable relatively to the chassis and having a bearing thereon to be lubricated from said central source, and a flow controlling outlet in advance of the bearing, a hose line bridging from the main frame to the relatively movable member and forming part of the conduit for delivery to said outlet, and subject to disintegration due to the action of the oil thereon, and means in the path of oil flow from the hose and in advance of the flow controlling outlet to prevent the debris of hose decomposition from reaching the flow controlling outlet.

7. A chassis lubricating system including a system of small-bore lubricant-filled distributing conduits into which oil is adapted to be forced under pressure, the distributing conduit system having highly restricted flow resistant outlets at the bearings to be lubricated, dense strainers arranged immediately in advance of the outlets to guard the latter against scale from the conduit walls, one of said conduits including a flexible section of hose subject to disintegration by the action of oil thereon, and means adjacent the outlet end of said hose and in advance of said strainer means, to intercept debris of hose decomposition from the oil stream flowing from said hose.

8. A chassis lubricating system including a system of small-bore lubricant-filled distributing conduits into which oil is adapted to be forced under pressure, the distributing conduit system having highly restricted flow resistant outlets at the bearings to be lubricated, dense strainers arranged immediately in advance of the outlets to guard the latter against scale from the conduit walls, one of said conduits including a flexible section of hose subject to disintegration by the action of oil thereon, and a felt strainer of texture denser than the dense strainers and of diameter substantially equal to the outer diameter of said hose and mounted adjacent the outlet end of the latter, to intercept debris of hose decomposition from the oil stream flowing from said hose.

9. As a new article of manufacture, a hose having a filter assembled therewith across the outlet end thereof to trap debris of hose decomposition.

10. As a new article of manufacture, a flexible non-metallic conduit section, subject to disintegration at the inner wall thereof, terminal pieces to couple the ends of said section in place, and filter means contained in the terminal piece at the outlet end of said flexible section.

11. As a new article of manufacture, a conduit section adapted to form part of a lubricant distributing system, said section including a flexible tube substantially non-dilatable under internal pressure and substantially oil-impervious at its interior, and means at the outlet end of said section for trapping debris of decomposition and preventing their entrance into the line beyond said section.

12. A terminal element for the outlet end of a flexible hose including a ferrule having a skirt encircling the hose and circumferentially contracted thereabout, a hard tubular member lying within the end of the hose and preventing internal constriction of the conduit by the constricted skirt and a filter carried by said ferrule beyond the end of the hose and disposed in the path of flow therefrom.

13. In combination with an automobile having a front axle with steering knuckles pivotally attached to the ends thereof and a chassis with longitudinal side members transverse to said axle and supported by spring means therefrom, a lubricating installation comprising a lubricant source supported upon the chassis, metallic conduits connected to said source and extending along said longitudinal chassis members, another metallic conduit extending along said axle and a flexible hose transverse to the chassis side members connecting the metallic conduit along one of said longitudinal chassis members and the conduit along said axle, said hose being connected to said chassis metallic conduit at a point substantially above the axle and to the axle metallic conduit at a point slightly inside of the spring means.

14. In combination with an automobile having a front axle with steering knuckles pivotally attached to the ends thereof and a chassis with longitudinal side members transverse to said axle and supported by spring means therefrom, a lubricating installation comprising a lubricant source supported upon the chassis, metallic conduits connected to said source and extending along said longitudinal chassis members, another metallic conduit extending along said axle, junctions upon the chassis metallic conduit and upon the axle metallic conduit, the former being to the rear of the axle and the latter being slightly inside of the spring means between the axle and the chassis and a flexible hose with protruding metallic ends enabling attachment of said hose to said junctions, said metallic ends and said junctions being so positioned and so constructed that the hose will extend substantially transversely of the chassis side members and at all times will be substantially inside of the chassis side members and substantially above the axle.

15. In combination with an automobile having a front axle with steering knuckles pivotally attached to the ends thereof and a chassis with longitudinal side members transverse to said axle and supported by spring means therefrom, a lubricating installation comprising a lubricant source supported upon the chassis, metallic conduits connected to said source and extending along said longitudinal chassis members, another metallic conduit extending along said axle and a flexible hose extending between a metallic conduit on one of the longitudinal chassis members and the metallic conduit on the axle, said hose being connected so as to extend in a vertical direction at its point of connection to the chassis and so as to extend in a horizontal direction at its point of connection to the axle.

16. In combination with an automobile having a front axle at the ends of which are pivoted steering knuckles and a chassis supported by spring means from said axle with longitudinal channel members transverse to said axle, a lubricating installation comprising a source of lubricant supported upon the chassis, metallic conduits extending the length of said channel members, another metallic conduit extending the length of the front axle and a flexible hose forming a connection between one of the metallic conduits on the channel members and the metallic conduit on the axle, said flexible hose being rigidly supported to extend vertically inside of said channel member by a bracket projecting inwardly from the lower portion thereof and upon the axle to extend in a horizontal direction by a junction attached to said axle at a distance inside of the spring means about equal to the normal elevation of the chassis side member above said axle.

17. As a new article of manufacture, a filter carrying terminal for the end of a flexible hose, said terminal including a ferrule cup having a filter therein, a disk-like clamp pressing said filter against the end of said cup, a tubular extension on the disk coaxial with the ferrule, said tubular extension entering the interior of the hose and said hose being compressed against the extension by the contracted ferrule skirt.

18. As a new article of manufacture, a filter carrying terminal for the end of a flexible hose, said terminal including a ferrule cup having a filter therein, a disk-like clamp pressing the filter against the end of the ferrule cup, a tubular extension on the clamp coaxial with the ferrule, said extension entering the interior of the hose and said hose being compressed against the extension by the contracted ferrule skirt, the filter receiving end of the ferrule cup being reduced and affording a shoulder abutting the edges of the clamp.

19. As a new article of manufacture, a filter carrying terminal for the end of a flexible hose, said terminal including a ferrule cup having a filter therein, a disk-like clamp pressing the filter against the end of the ferrule cup, a tubular extension on the clamp coaxial with the ferrule, said extension entering the interior of the hose and said hose being compressed against the extension by the contracted ferrule skirt, the filter receiving end of the ferrule cup being reduced and affording a shoulder abutting the end of the clamp, the filter having metal screen backing plates and the clamp having an annular rib engaging one of said screens.

20. In combination with a mechanism having relatively moving structural parts, a central lubricating installation for the bearings of said mechanism with a central reservoir and pump on one part, rigid metal piping conduit systems leading lubricant from said central pump toward said bearings rigidly attached to each part with metering outlets to the bearings and flexible hose conduit means for conveying lubricant from one conduit system to the other, said hose means comprising terminal junctions upon said conduit systems on each of said structural parts in proximity to each other, a single, non-articulated length of flexible hose extending between said junctions and having a substantially greater length than the distance between said parts, substantially rigid metallic extensions firmly connected to the respective ends of said length of flexible hose and of somewhat smaller diameter than said flexible hose, the ends of said extensions being rigidly connected to said junctions, said junctions and extensions being positioned so that said hose and its ends will always lie substantially in the plane of movement of the second mentioned part not carrying the pump throughout relative movement of said parts.

21. In combination with a motor vehicle having a chassis frame and a structural axle part below said chassis frame moving relatively thereto, a central chassis lubricating system for the bearings on said frame and axle part with a central reservoir and pump on the chassis frame, rigid metallic piping conduit systems leading lubricant from the central pump toward the bearings, rigidly attached to the chassis frame and the axle part with metering outlets to the bearings and flexible hose conduit means for conducting lubricant from the chassis system to the axle system including terminal junctions upon said distributing piping systems at points of proximity of said chassis frame and said structural part, a length of flexible hose extending between and forming a lubricant connection between said terminals and having substantially greater length than the distance between the terminal junctions, the junctions and the hose being so constructed and arranged that said hose and said junctions will lie in substantially the same vertical plane during all phases of the movement between said chassis frame and said structural part.

22. The combination of claim 21 in which said plane also is substantially coincident with the plane of the relative movement of said structural axle part in respect to said chassis.

23. The combination of claim 21 in which the terminal junction on the chassis frame is positioned substantially above and to one side of the terminal junction on the relatively moving structural axle part and in which the flexible hose extends between said terminal junctions in the form of a substantially J-shaped loop in a vertical plane.

24. The combination of claim 21 in which the terminal junctions and the hose are so constructed and arranged that the ends of the hose are perpendicular to each other and will maintain their perpendicularity through substantially all phases of relative movement.

25. The combination of claim 21 in which the structural axle part is attached to the chassis frame by a vehicle spring connection and in which the terminal junction on the chassis frame is positioned adjacent the place of attachment of the spring connection to the chassis frame, the flexible hose extending across said spring connection.

26. In combination with a mechanism having relatively moving structural parts, a central lubricating installation for the bearings of said mechanism with a central reservoir and pump on one part, rigid metal piping conduit systems leading lubricant from said central pump toward said bearings rigidly attached to each part with metering outlets to the bearings and flexible hose conduit means for conveying lubricant from one conduit system to the other, said hose means comprising terminal junctions upon said conduit systems on each of said structural parts in proximity to each other, a single, non-articulated length of flexible hose extending between said junctions and having a substantially greater length than the distance between said parts, substantially rigid metallic extensions firmly connected to the respective ends of said length of flexible hose and of somewhat smaller diameter than said flexible hose, the ends of said extensions being rigidly connected to said junctions, said junctions and extensions being positioned so that said hose and its ends will always lie substantially in the plane of movement of the second mentioned part not carrying the pump throughout relative movement of said parts, the hose consisting of a reinforced rubber hose.

27. In combination with a mechanism having relatively moving structural parts, a central lubricating installation for the bearings of said mechanism with a central reservoir and pump on one part, rigid metal piping conduit systems leading lubricant from said central pump toward said bearings rigidly attached to each part with metering outlets to the bearings and flexible hose conduit means for conveying lubricant from one conduit system to the other, said hose means comprising terminal junctions upon said conduit systems on each of said structural parts in proximity to each other, a single, non-articulated length of flexible hose extending between said junctions and having a substantially greater length than the distance between said parts, substantially rigid metallic extensions firmly connected to the respective ends of said length of flexible hose and of somewhat smaller diameter than said flexible hose, the ends of said extensions being rigidly connected to said junctions, said junctions and extensions being positioned so that said hose and its ends will always lie substantially in the plane of movement of the second mentioned part not carrying the pump throughout relative movement of said parts, the terminal junctions being so arranged as to hold the ends of the hose perpendicular to each other.

28. In combination with a mechanism having relatively moving structural parts, a central lubricating installation for the bearings of said mechanism with a central reservoir and pump on one part, rigid metal piping conduit systems leading lubricant from said central pump toward said bearings rigidly attached to each part with metering outlets to the bearings and flexible hose conduit means for conveying lubricant from one conduit system to the other, said hose means comprising terminal junctions upon said conduit systems on each of said structural parts in proximity to each other, a single, non-articulated length of flexible hose extending between said junctions and having a substantially greater length than the distance between said parts, substantially rigid metallic extensions firmly connected to the respective ends of said length of flexible hose and of somewhat smaller diameter than said flexible hose, the ends of said extensions being rigidly connected to said junctions, said junctions and extensions being positioned so that said hose and its ends will always lie substantially in the plane of movement of the second mentioned part not carrying the pump throughout relative movement of said parts, the structural parts being resiliently connected to each other by an elongated leaf spring and in which the length of flexible hose extends transversely to said leaf spring between said terminal junctions.

JOSEPH BIJUR.